Dec. 25, 1951  E. SCHMID  2,579,868
PIVOTED HAND TOOL FOR LOOSENING
TIRE BEADS FROM RIM FLANGES
Filed July 15, 1948  2 SHEETS—SHEET 1
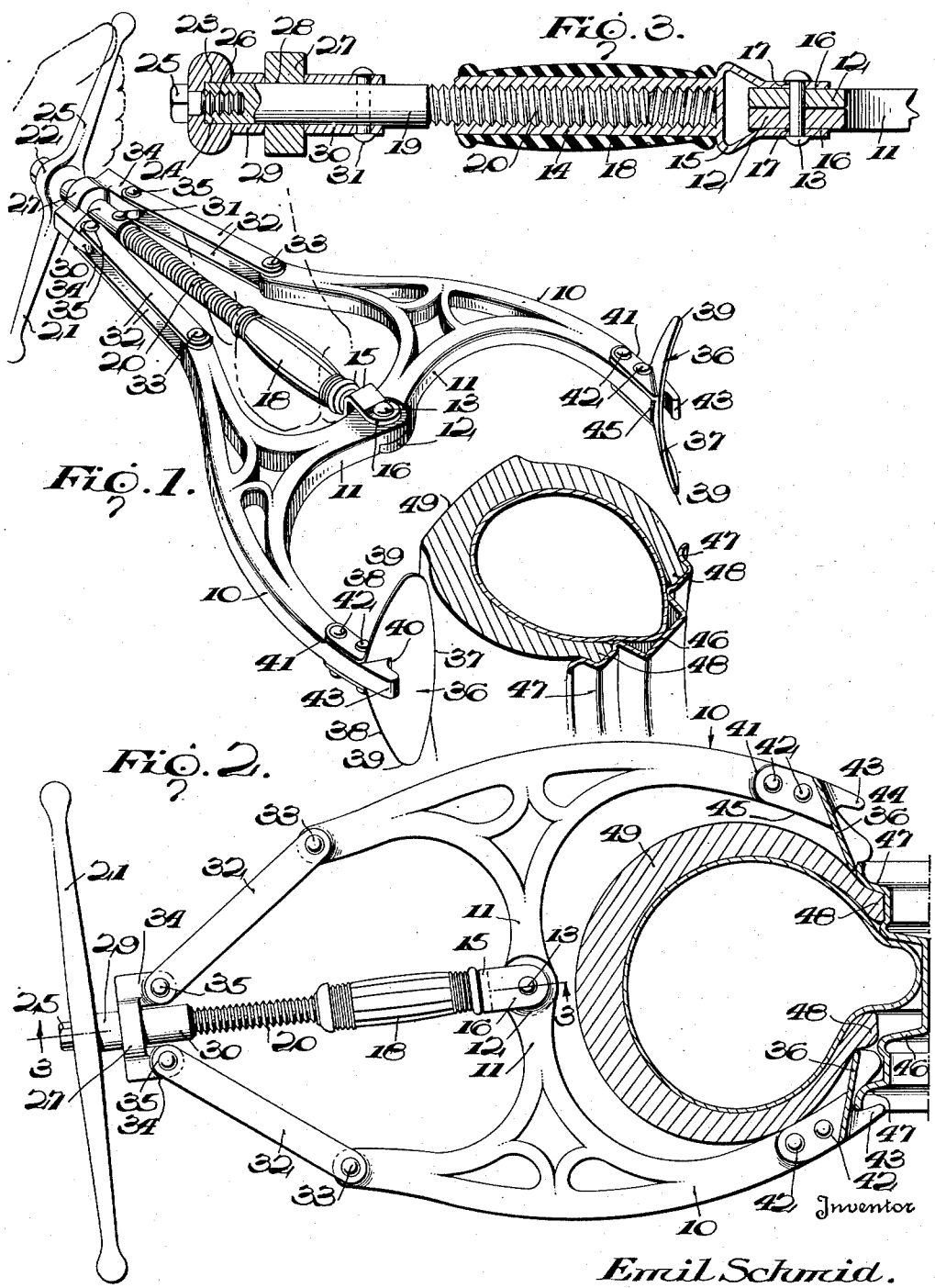
Inventor
Emil Schmid.

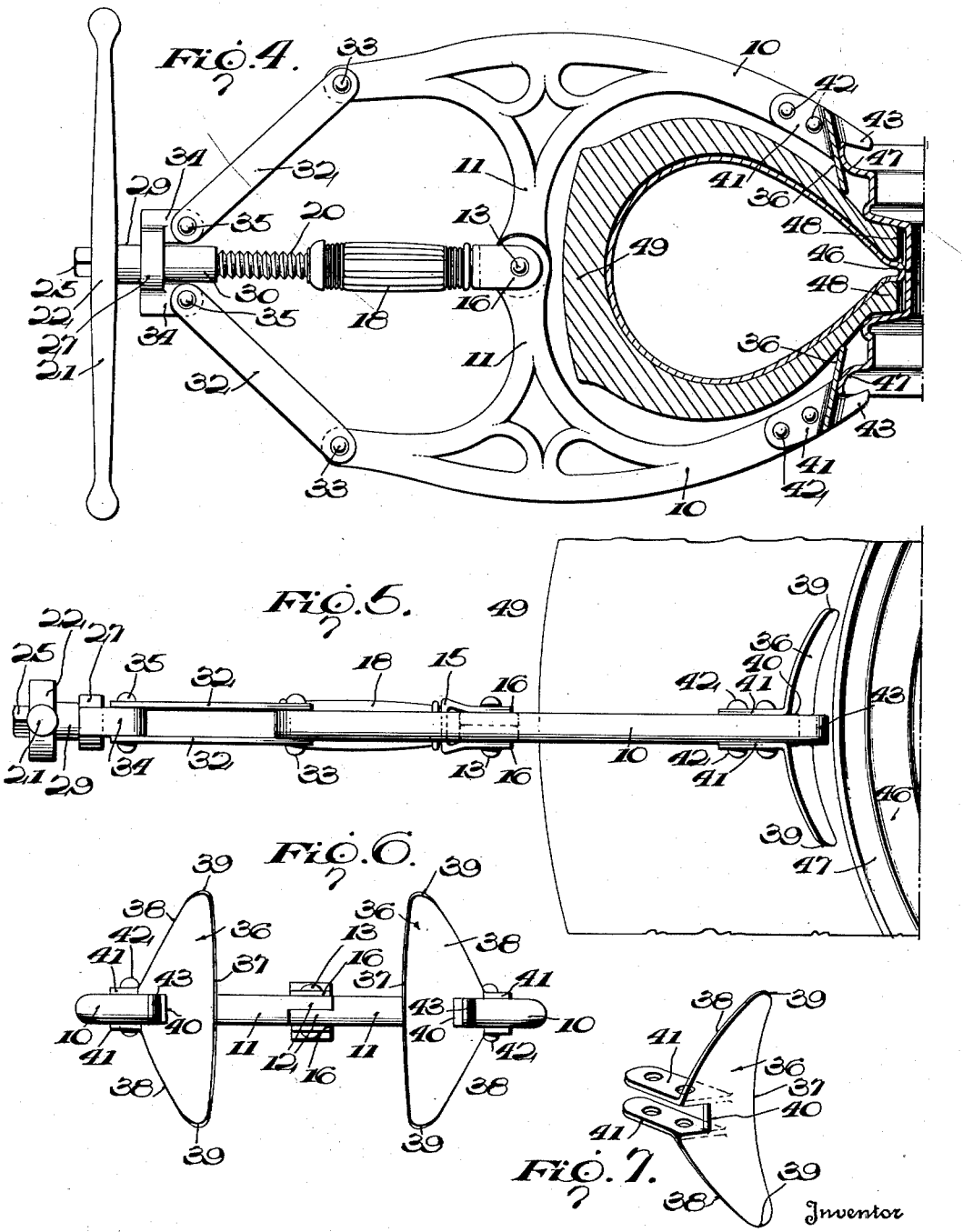

Patented Dec. 25, 1951

2,579,868

UNITED STATES PATENT OFFICE 2,579,868

PIVOTED HAND TOOL FOR LOOSENING TIRE BEADS FROM RIM FLANGES

Emil Schmid, Washington, D. C.

Application July 15, 1948, Serial No. 38,765

1 Claim. (Cl. 157—1.28)

My invention relates to a tool for removing tire casings from drop center rims of automobile wheels.

An important object of the invention is to provide a tool of the above mentioned character, having thin blades which are moved inwardly diagonally between the flanges of the rim and the beads of the tire casing, to break the freeze or lock between the beads and rim, without liability of injury to the tire casing or rim.

A further object of the invention is to provide a simplified readily portable tool which may be manipulated by a single operator.

Other objects and advantages of the invention will be apparent during the course of the following description.

In the accompanying drawings forming a part of this application and in which like numerals are employed to designate like parts throughout the same, Figure 1 is a perspective view of a tool embodying my invention, the same being shown open and held in position for engaging a tire and rim, the tire and rim being shown in section, Figure 2 is a side elevation of the tool after the same has been brought into engagement with the tire and rim and partly closed for breaking the freeze between the rim and one bead of the tire casing, Figure 3 is an enlarged longitudinal vertical section taken on line 3—3 of Figure 2, part broken away, Figure 4 is a side elevation of the tool showing the same applied to the tire and rim and completely closed for breaking the freeze between the rim and both beads of the tire casing, Figure 5 is an edge elevation of the tool as applied to the tire and rim, Figure 6 is an end elevation of the tool, and, Figure 7 is a perspective view of a curved blade and ears.

In the drawings, wherein for the purpose of illustration is shown a preferred embodiment of my invention, the numeral 10 designates longitudinal arms, which are longitudinally curved and converge forwardly. Arranged between the ends of the arms 10 are transverse arms 11, formed integral therewith. Formed integral with the inner ends of the arms 11 are knuckles or heads 12, pivotally connected by a rivet 13 or the like.

Arranged between the rear ends of the arms 10 is a longitudinal center tube 14, having a head 15 rigidly secured to its end, and this head carries spaced knuckles 16 formed integral therewith and having apertures 17 to receive the pivot element or rivet 13. It is thus seen that the tube 14 is pivotally connected with the transverse arms 11 to support the same. The tube 14 carries a tubular hand grip 18, as shown, formed of rubber or the like.

A longitudinal operating rod or shaft 19 is provided, telescoping with the tube 14 and having screw threaded engagement therewith, as shown, at 20. A handle 21 is provided, having a head 22 at its longitudinal center, provided with a recess 23 which is square in cross section, to receive the end 24 of the shaft 19, which is also square in cross section. A bolt 25 is provided passing through an opening in the head 22 and having screw threaded engagement within a longitudinal opening 26, as shown. The handle is therefore rigidly connected with the shaft and this connection may be effected by any suitable means. The shaft 19 has a cross head 27 mounted thereon, having an opening 28 in which the shaft 19 rotates. A sleeve 29 surrounds the shaft 19 and is confined between the head 22 and the cross head 27. A second sleeve 30 is mounted upon the shaft 19, upon the opposite side of the cross head and is rigidly secured thereto by rivets 31. Pairs of links 32 are disposed upon opposite sides of the rear ends of the arms 10 and are pivotally connected therewith by rivets 33 or the like, and the opposite ends of these links are disposed upon opposite sides of extensions 34 of the cross head 27 and are pivotally connected therewith by rivets 35 or the like. The cross head 27 therefore has a swiveled connection with the shaft 19, and when the shaft is rotated with respect to the tube 14, the arms 10 will be swung upon their pivots 13.

Disposed adjacent to the forward ends of the arms 10 are relatively thin elongated curved metal blades 36, preferably formed of steel. These blades extend transversely of the arms 10. The blades 36 are longitudinally curved to conform generally to the outer circumference of the rim, and have a length of approximately one-eighth of the circumference of the rim and are about one-eighth of an inch thick. These blades are transversely inclined with relation to the forward ends of the arms 10 and converge inwardly. The blades 36 have rounded or blunt edges 37. The outer edges 38 of the blades taper toward the opposite ends of the blades forming rounded ends 39, but the inner edges 37 are preferably straight and parallel, and the blades are preferably transversely flat. Each blade is provided upon its outer edge and at its transverse center with a notch 40 to receive the outer end portion of the arm. Each blade has a pair of ears 41 rigidly secured thereto, at the opposite sides of the notch 40, and these ears are disposed upon opposite sides of the arm 10 and are rigidly secured to this arm by rivets 42 or the like. Each arm 10 is provided at its forward end with a reduced stop extension 43, forming a recess 44 between the stop extension and the forward face of the blade. The arm 10 has a shoulder 45 engaging the rear face of the blade.

As stated, the longitudinally curved blades 36 are preferably formed of steel and are relatively stiff, but sufficiently resilient so that they may flex and conform to the curvature of rim flanges of different diameters. All other parts of the tool excepting the sleeve 19 may be formed of metal or any other suitable material.

The numeral 46 designates a drop center rim of a conventional type having flanges 47, and 48 designates the beads of a tire casing 49.

The tool may be used in removing tire casings when the wheel is still upon the automobile. The automobile would then be jacked up and the forward ends of the arms 10 opened sufficiently so that the blades 36 may be passed over the tire casing. The handle 21 is then turned to draw the blades inwardly and the inner edges 37 of the blades will first contact with the beads 48 of the tire casing and the outer edges of the flanges 47, as indicated at the top in Figure 2. The handle 21 is further rotated and the blades 36 move further toward each other. The beads 48 frequently become frozen to the rim, and as the blades 36 move toward each other, one bead frequently is freed from the rim before the other. Further inward movement of the blades will bring the stop extension 43 of one arm into contact with the adjacent flange 47 of the rim, as indicated at the bottom in Figure 2. Continued inward movement of the blades 36 will cause the entire tool to pivot upon the flange 47 engaged by the stop extension 43, Figure 2, and the other blade 36 will break the freeze between the adjacent bead and the rim. During the operation of the tool, in separating the beads of the tire casing from the rim, the blades 36 move inwardly radially and also laterally inwardly and partake of a diagonal movement. This diagonal movement of the blades causes the blades to produce a peeling action between the covered portions of the beads and the rim flanges. This prevents the blades from injuring the tire casing or rims. The transverse inclination of the blades forces them to follow the contour of the tire casing, and to slide inwardly between the bead of the casing and rim flange, with a minimum amount of pressure upon the side walls of the tire casing. When the stop extensions 43 contact with the rim flanges 47, they limit the inward movement of the blades. After the blades have broken the freeze between the beads and rim, the complete separation of the tire casing may be effected by the use of the ordinary rubber hammer, as is well known.

I contemplate omitting one of the blades 36, since the device may be used with some degree of success with one blade, by reversing the tool during operation.

The tool is relatively small and light and can be easily manipulated by a single operator grasping the hand grip 18 in one hand and the handle 21 in the other hand. By proper manipulation of the tool it may be passed beneath the chassis and fender and applied to the tire casing when the wheel is on the car. The tool also may be used to remove the tire casing from the rim when the wheel is separated from the automobile.

It is to be understood that the form of my invention herewith shown and described is to be taken as a preferred example of the same, and that various changes in the shape, size and arrangement of parts may be resorted to, without departing from the spirit of my invention of the scope of the subjoined claim.

Having thus described my invention, I claim:

A tool for use in removing tire casings from drop center rims of automobile wheels, comprising a pair of pivotally connected opposed arms having free ends, said arms in use being arranged generally radially of the tire casing, means connected with the arms to shift the longitudinal axes of the arms laterally for moving the free ends of the arms toward and from each other, a pair of opposed thin laterally flexible blades which are mounted near their longitudinal centers upon the free ends of the arms, each blade being transversely inclined with respect to the free end of the longitudinal axis of the arm for approximately forty-five degrees and having its rear face inclined for approximately forty-five degrees from the outer side of the tire casing when engaging the tire casing, each blade extending inwardly beyond the inner edge of the arm for a substantial distance, each blade having a substantially straight blunt edge extending substantially throughout the entire length of the blade, the inclination of the blade with respect to the longitudinal axis of the arm causing said edge to slidably engage the side of the tire casing when separating the same from the rim, each blade being longitudinally curved to correspond generally to the curvature of the rim and being stiff in a direction at right angles to the direction of flexing of the blade, and a stop extension carried by the free end of each arm and spaced from the inner blunt edge of the blade a sufficient distance so that the blade will shift the side of the tire casing inwardly to enter the drop center of the rim and then limit the inward movement of the blade.

EMIL SCHMID.

REFERENCES CITED

The following references are of record in the file of this patent:

UNITED STATES PATENTS

| Number | Name | Date |
|---|---|---|
| 57,447 | Stockmar | Aug. 21, 1866 |
| 1,066,210 | Mahon | July 1, 1913 |
| 1,317,143 | Peterson | Sept. 23, 1919 |
| 1,447,113 | Woodhall | Feb. 27, 1923 |
| 1,966,766 | Raby et al. | July 17, 1934 |
| 2,333,880 | Ohlsen | Nov. 9, 1943 |
| 2,439,135 | Johnson et al. | Apr. 26, 1948 |
| 2,446,963 | Stolz | Aug. 10, 1948 |
| 2,481,764 | Luton | Sept. 13, 1949 |
| 2,492,329 | Smith | Dec. 27, 1949 |

FOREIGN PATENTS

| Number | Country | Date |
|---|---|---|
| 596,929 | France | Aug. 17, 1925 |